United States Patent [19]
Gerber et al.

[11] 3,711,732
[45] Jan. 16, 1973

[54] MINIATURE SYNCHRONOUS MOTOR

[75] Inventors: Hermann Gerber, Courgevaux; Peter Frey, Murten, both of Switzerland

[73] Assignee: Sain A.G., Friboug, Switzerland

[22] Filed: Feb. 2, 1971

[21] Appl. No.: 111,840

[30] Foreign Application Priority Data

Feb. 17, 1970 Switzerland..................2225/70

[52] U.S. Cl......................310/162, 310/43, 310/257
[51] Int. Cl..................................................H02k 19/00
[58] Field of Search...........310/43, 42, 83, 162-165, 310/255, 256, 89, 40 MN

[56] References Cited

UNITED STATES PATENTS

| | | | |
|---|---|---|---|
| 3,310,697 | 3/1967 | Lace | 310/164 |
| 3,241,111 | 3/1966 | Sandstrom | 310/43 |
| 3,231,770 | 1/1966 | Hyde | 310/162 X |
| 3,459,982 | 8/1969 | Cartier | 310/257 X |
| 3,448,306 | 6/1969 | Murray | 310/83 |
| 3,551,711 | 12/1970 | Davis | 310/43 |

Primary Examiner—D. F. Duggan
Attorney—Imirie & Smiley

[57] ABSTRACT

A miniature synchronous motor is made by forming a toothed stator in two parts. One part is moulded into a coil former by injection moulding, the moulding carrying a rotor bearing seating. The other part is located on and fastened to the first part unit by an insulating shell which also carries a rotor bearing seating. The rotor is multipolar and permanently magnetized.

13 Claims, 4 Drawing Figures 3,711,732

INVENTORS
HERMANN GERBER
PETER FREY
BY
Imrie & Smiley
ATTYS

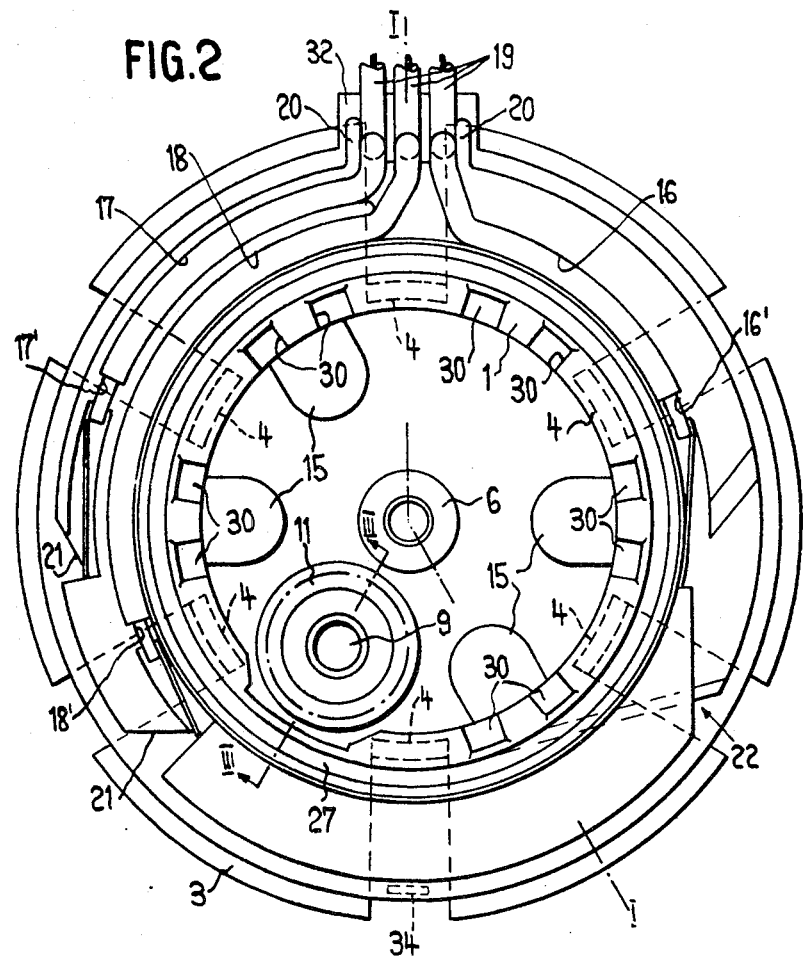

MINIATURE SYNCHRONOUS MOTOR

The present invention relates to a miniature synchronous motor having sheet metal stator parts, the pole teeth of which pass axially between the coil and the rotor and a method of manufacture thereof. In known synchronous motors of this kind the stator parts form the actual frame in which the bearings are mounted, the coil body inserted together if necessary with further parts, such as bearing pins for a ratchet wheel or the like, riveted to a stator part. Such production of synchronous motors entails a considerable number of operations and is hence relatively costly. Considerable demands are made on the precision of the punch tools.

According to the present invention there is provided a miniature synchronous motor with sheet metal stator parts the pole teeth of which pass between the coil and the rotor, wherein one stator part is moulded into a coil former made of insulating material and hence is rigidly connected therewith, the coil former having one bearing seating for a rotor bearing.

Further according to the present invention there is provided a method of producing a miniature synchronous motor comprising the steps of placing a punched sheet metal stator part in a mould, injection moulding therein a coil former of plastics material having a bearing seating for the rotor and a bearing pin for a wheel, both combined with the stator part, sliding the wheel on to the bearing pin, and then connecting the unit consisting of the coil former and stator part, to the remaining motor parts. By combining the coil former with one stator part and with a bearing the structure is considerably simplified and the position of the bearing is rendered independent of the precision of the punched stator part. Preferably the other bearing is also formed as part of a plastics material shell which is inserted between the other stator part and the coil former and which is accurately centered relative to the coil former. The actual frame in this case may be made of plastics material components, whilst the stator parts, made of sheet metal, are connected to the plastics material parts and enclose these in a protective manner.

Reference should now be made to the accompanying drawings which shows an embodiment of a synchronous motor of the invention.

FIG. 2 is an end view of the coil body,

Figure 1:
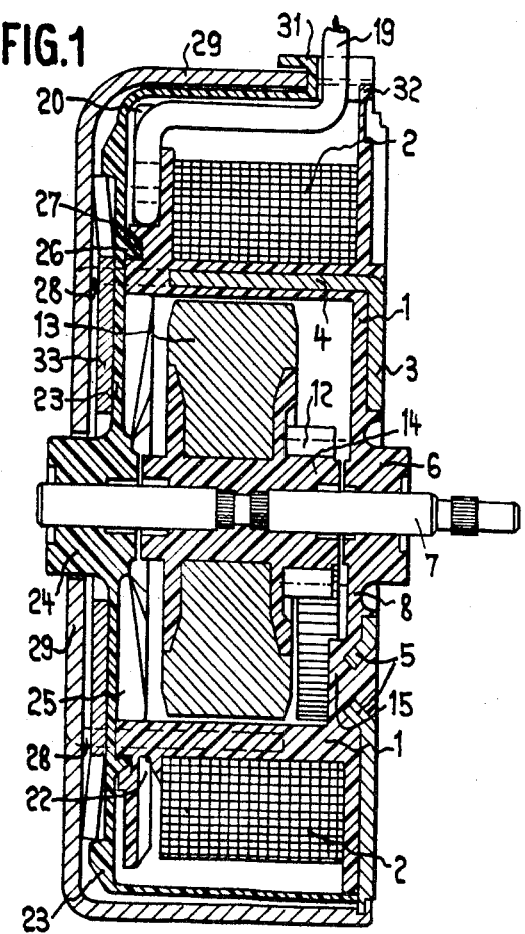
FIG. 1 is a cross-section through the motor on the line I—I of FIG. 2
Figure 3:
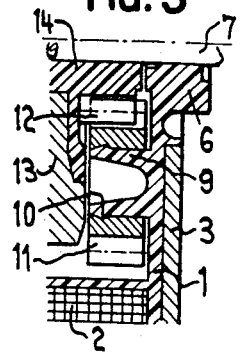
FIG. 3 is a part section taken on the line III—III of FIG. 2.

A miniature synchronous motor according to FIGS. 1 to 3 has an injection moulded plastics material coil former 1, in the winding space of which a coil 2 is located. One sheet metal stator part 3 is partly surrounded by the plastics material of the coil former 1 during injection moulding. The stator part 3 consists of a substantially flat disc from which pole teeth are formed and bent axially inwards. These teeth engage the coil former 1 and produce a good connection between both parts. For further mutual anchoring, the stator part 3 is provided at suitable points with openings with conically depressed edges 5 engaging in thickened points 15 of the coil former 1 and providing a very rigid connection between parts 1 and 3.

The coil former 1 has a bearing 6 for the rotor axle 7. The bearing portion of the coil former is connected to the outer coil former parts by means of a weakened point 8, so that the bearing part 6 can be adjusted to an accurately coaxial position relative to the second bearing part mentioned below. A slightly enlarged inner section of the bearing bore 6, and also of the opposite bearing, forms a capillary space in which oil is stored.

The coil former 1 has a hollow moulded in bearing pin 9 having a safety collar 10 at its free end. On this bearing pin 9 there is a ratchet wheel 11 of plastics material, which is prevented from dropping off the bearing pin 9 by the collar 10, but may rotate freely. The ratchet wheel 11 meshes with a corresponding ratchet wheel 12 of the rotor. The latter consists of a single permanent multipolar ring magnet 13 which is connected to the rotor axle 7 by means of a plastics material boss 14.

The end face of the coil former remote from the stator part 3 is provided with grooves 16 – 18 formed between ribs and having constricted points 16' – 18' for locating the solder joints between connecting cables and coil ends. The connecting cables 19 are secured outside the grooves 16 – 18 between two horns 20 and extend axially outside the coil space to a passage.

In FIG. 2 three connections are shown of which one is lead to a center tapping of the coil. For suitable insertion of the coil ends or tappings, notches 21 of suitable depth are formed in the coil former flange, or a passage 22 for the inner coil end is provided between two overlapping wall portions of the coil flange.

The coil former 1 is enclosed by a plastics material shell 23 which carries a bearing 24. The relatively thin-walled shell 23 is provided interiorly with reinforcing ribs 25. A ring rib 26 of the shell 23 engages in a ring groove 27 of the coil former 1 and is accurately centered against the inside shoulder of the groove 27. This ensures an accurate centering of the parts 1 and 23 and the bearings 6 and 24. The shell 23 is provided with slots, not shown in detail, through which the teeth 28 of the stator 29, indicated only at two points for simplicity, can pass. These teeth are arranged in pairs and engage in axial grooves 30 of the coil former 1 (FIG. 2). The substantially cylindrical outer surface of the stator 29 engages the stator part 3. In the region of the horns 20 of the coil former 1 or an insulating collar 31 of the shell 23, the stator 29 and the shell 23 have radially enlarged positions which outside the coil space form an axially extending through passage for the connecting cables 19.

The coil space is hence not limited by the connecting cables. The shape of the enlarged positions is indicated in FIG. 2 by the corresponding shape of a radially projecting flange 32 of one end flange of the coil former 1.

Between the stator 29 and the shell 23 an irregular short-circuit ring 33 is inserted for partly screening the pole teeth 28. In the assembled motor this short-circuit ring is slightly resiliently deformed and retains the loosely inserted shell 23 flush against the coil former 1. This not only ensures accurate mutual centering of these parts but also safeguards the connecting cables in the grooves 16 – 18 of the coil former.

In the synchronous motor shown, complete insulation of all live parts from the other metal parts is effected by completely encasing the coil and the connecting cables between coil former 1 and shell 23. The interlocking parts 26 and 27 not only provides a centering action but also an increase in the insulation distance from the coil space to the teeth. If a yet higher degree of insulation is demanded, then the flange 32 formed as a weakened wall portion and a further weakened diametrically opposite point 34 may be broken, and a suitable sealing compound injected through the opening formed at the flange 32, whilst the broken out point 34 serves for ventilation.

Figure 4:
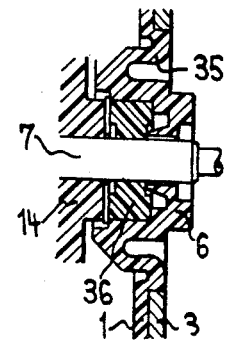
FIG. 4 is an alternative embodiment of the bearing.

Further alternative embodiments are possible. The coil may be formed without a tapping, for only one voltage. In accordance with FIG. 4 the weakened elastic point between the actual coil former and the bearing portion integral therewith may be made nore flexible by using an S-shaped rib 35. The bearing of plastics material may be replaced by a sintered bearing 36 pressed into a bearing shell.

Production and assembly of the motor are particularly simple. The punched-out stator part 3 is inserted in the mould for producing the coil former 1 and the latter is injection moulded. Then the ratchet wheel 11 is placed on to the integrally moulded bearing pin 9. After winding the coil, providing the connections and inserting the rotor, the loosely joined parts 23, 33 and 29 are slipped on into the position shown and then the stator parts 3 and 29 flange-connected. Hence no screwing or riveting operations are necessary. The connecting cables 19, which in the assembled motor are retained between the flange 32 and the collar 31, need not be drawn through insulating bushes as is usually the case in known motors, but when the parts 1 and 23 are joined together, they are enclosed in the insulated passage formed by the parts 31 and 32.

We claim:

1. A miniature synchronous motor comprising two sheet metal stator parts with pole teeth, an energizing coil outside said pole teeth, an insulating moulded former carrying said coil, and a rotor, one stator part being imbedded in said coil former so as to be rigidly connected therewith and a bearing seating for a rotor bearing carried by said coil former.

2. A motor as recited in claim 1, including a bearing pin for a ratchet wheel carried by said former.

3. A motor as recited in claim 1, including a shell of insulating plastics material loosely inserted between the other stator part and said coil former, a radial flange on said shell carrying another bearing seating and an axial flange on said shell covering the coil space of said coil former.

4. A motor as recited in claim 3, wherein said coil former and said radial flange of said shell are provided with interlocking shoulders centering as means.

5. A motor as recited in claim 1, wherein said former has a free end flange provided with grooves to receive connecting cables and solder joints, with notches or grooves for passing coil ends and tappings through.

6. A motor as recited in claim 5, wherein said end flange, at least at one point, is double-walled to form a passage groove for the inner coil end.

7. A motor as recited in claim 3, wherein said radial flange of said coil former has a weakened, elastic point which permits a flush bearing position.

8. A motor as recited in claim 1, wherein said bearing seating is formed as a shell, and a metal bearing inserted in said shell.

9. A motor as recited in claim 3, including seating means for the coil space defined between said coil former and said shell.

10. A motor as recited in claim 3, with irregular short-circuit discs located between said other stator part and said shell to press the latter resiliently against said coil former.

11. A motor as recited in claim 3, wherein said other stator part is shell-shaped and has a substantially cylindrical outer surface, the latter being radially enlarged at one point for receiving the connecting cables for said motor.

12. A motor as recited in claim 11, wherein said shell has a radially enlarged point which engages in an enlargement of said stator jacket.

13. A miniature synchronous motor comprising two sheet metal stator parts with pole teeth, an energizing coil, an insulating moulded former carrying said coil, a rotor and a ratchet wheel mounted for cooperation with said rotor, one stator part being imbedded in said coil former so as to be rigidly connected therewith and a bearing seating for a rotor bearing and a bearing pin for said ratchet wheel being made in one piece with said coil former.

* * * * *